March 26, 1929.  C. S. WEYANDT ET AL  1,706,721
METHOD OF MAKING MAGNETIC CIRCUIT CONDUCTORS
Filed Nov. 21, 1923
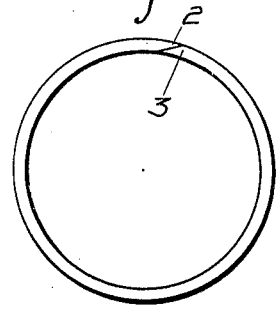
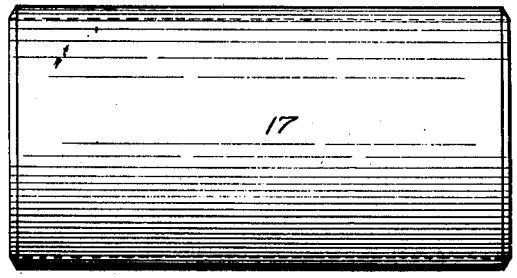
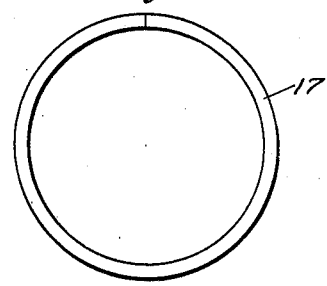
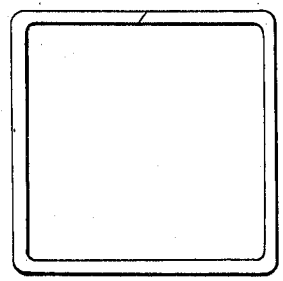
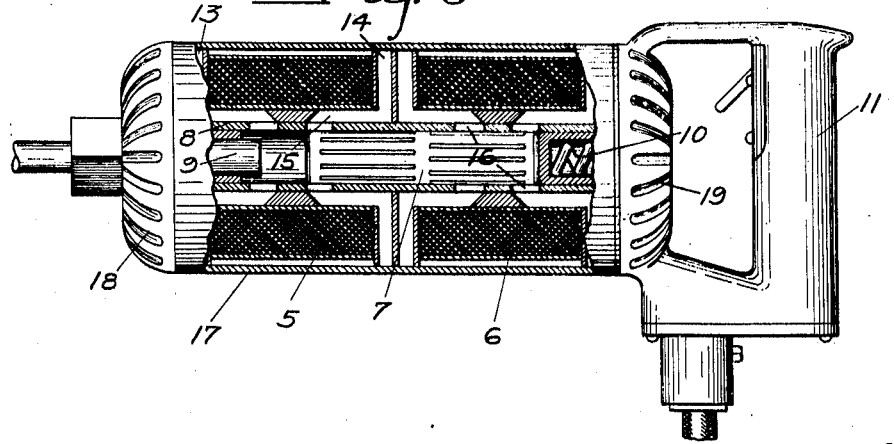
INVENTORS Patented Mar. 26, 1929.

1,706,721

UNITED STATES PATENT OFFICE.

CARL S. WEYANDT AND HAROLD E. FOX, OF PITTSBURGH, PENNSYLVANIA, ASSIGNORS, BY MESNE ASSIGNMENTS, TO CENTRAL ELECTRIC TOOL COMPANY, A CORPORATION OF PENNSYLVANIA.

METHOD OF MAKING MAGNETIC-CIRCUIT CONDUCTORS.

Application filed November 21, 1923. Serial No. 676,106.

Our invention relates to magnetic circuit conductors serving as casings for electric tools and methods of preparing such casings for particular application to ironclad electro-magnets.

An object of our invention is a method of preparing a casing of low carbon silicon steel for electromagnets for such service or for other service that requires the machining of the casing as a rigid tubular structure.

In practicing our invention we roll a sheet of low carbon silicon steel to substantially the desired shape and size which is required to fit the electromagnet with which the casing so formed is to be used. The loose or free side edges are then loosely welded by the heat of the metal itself to form a rigid tubular structure to permit machining or otherwise working on the tube. After the tube is machined to proper length and other desired dimensions, the loose weld is broken open to provide a slit in the casing to eliminate the induced current losses that would be effected therein.

In the accompanying drawings, Fig. 1 is a side elevational view of a tube to be used as a casing; Figs. 2, 3 and 4 are end views of tubes of different shape; and Fig. 5 is a longitudinal sectional view of an electric hammer of the reciprocating motor type, to which a casing embodying our invention may be particularly applied.

In preparing the tubes for service as casings, a sheet of silicon steel is rolled into a tube of substantially the desired shape and size as illustrated in Figs. 2, 3 and 4 and is cut to the approximate length that is desired. The sheet is preferably provided with tapered portions 2 and 3 that will overlap somewhat when the tube is rolled. The overlapped portions are then loosely welded.

The surface of the low carbon silicon steel has a thin layer of oxid thereon which prevents a fusing weld that will fuse the two portions into a homogeneous substance. Only a surface adherence or loose weld is obtained. We employ the expression loose weld in this application to comprehend a surface adherence, between two metals, which may be easily broken by a relatively small force, as distinguished from a fusion weld whereby the molecular structures of both metals are intimately mixed, or disposed, to constitute a homogeneous mass.

The expression loose weld is intended to include lap welds, butt welds and any other weld which is merely a surface adherence of the aforementioned character.

The loose weld so obtained between the overlapping portions of the tube is strong enough to maintain the tube as a rigid structure to permit machining the tube to approximately the size desired and to remove high spots, rough edges, etc.

The metal which we preferably use consists of silicon steel having 2 to 4% silicon and low carbon content, preferably not exceeding 0.1%. Silicon steel of this character has high electrical resistance and high magnetic permeability and for a magnetic circuit is almost as good as laminated steel.

A tube of this metal is particularly applicable as a casing for an electromagnet. In Figure 5 is illustrated an electric hammer of the reciprocating motor type to which we have applied the silicon steel tube as a casing.

The hammer comprises in general two operating coils 5 and 6, a movable piston or core 7, a barrel or guide 8 for the core 7, a tool 9 that is struck by the core to do useful work, a shock-absorbing spring 10 and a handle 11.

The coils 5 and 6 are provided with magnetic circuits including end laminations 13 and 14 and middle lamination 15. The laminations are provided with pole tips 16 that extend into openings in the barrel 8 to within a few thousandths of an inch from the inner surface thereof which guides the movement of the core 7.

The magnetic flux passing between the pole tips in the magnetic circuit of each coil acts upon the core to effect its actuation in each direction.

In order to provide a protective casing that shall also serve as a conducting medium of low reluctance to the magnetic flux developed by both coils, we provide a casing 17 of low carbon content silicon steel which also has a high electrical resistivity and tends, therefore, to diminish eddy current losses.

In preparing the casing for service a sheet of steel is rolled or shaped as indicated in Figs. 2 and 4 into a tube or pipe of the approximate diameter required to permit its disposition over the coils of the hammer and the edges of the tube are loosely welded. It is immaterial whether a butt or lap weld is made since it is necessary only to hold the tube together as a rigid structure to permit machining to exact size, trimming the edges, etc. The weld is then broken and the casing disposed on the hammer. The end edges of the casings are bevelled somewhat so that when the casing is secured between the nose piece 18 and the handle washer 19 of the hammer, any internal stress in the casing is rendered ineffective to distort the casing from its desired substantially cylindrical form.

Silicon steel has heretofore never been used in tubular form because of the difficulty of effecting a solid or fusion weld. We have found however, that a loose weld is sufficiently strong to permit machining and thereafter, in an application, such as herein illustrated, as a casing for an iron-clad magnet, the opening of the weld introduces a desirable and serviceable air gap for electrical resistance.

Although we have particularly specified silicon steel as the metal which we employ because of its desirable magnetic and electrical characteristics, it will be readily apparent that any other metal having similar characteristics may be used. Moreover, the casing may be applied to electromagnets of different types without departing from the scope and spirit of the invention as set forth in the appended claims.

It shall be understood that the terms "tube" and "tubular" include and refer to structures which may be of elliptical, circular, polygonal, or other form suitable to the herein described invention.

We claim as our invention—

1. The method of preparing and disposing the casing of an iron-clad electric tool which consists in rolling the metal to be used into a tube with overlapping edges, loosely securing the overlapping edges, working the tube to its proper shape, and then separating the edges to provide a slit in the tube.

2. The method of preparing a casing for an electric hammer in which the casing shall constitute a portion of the magnetic circuit of the hammer, which consists in rolling the tube into substantially the desired diameter and shape, closing the tube with a loose lap weld, cutting the tube to the desired length and then opening the lap seam to provide a slit in the tube.

3. The method of preparing a silicon steel tube for service as a casing for an electric hammer in which the casing also serves as a portion of the magnetic circuit, which consists in rolling silicon sheet steel into tubing of substantially desired shape and diameter, welding the ends longitudinally of the tube, cutting the tube to the desired length and then opening the welded seam to provide a longitudinal slit in the tube.

4. The method of preparing a silicon steel casing for an electromagnetic device in which the casing also serves as a portion of the magnetic circuit, which consists in rolling silicon sheet steel to substantially the desired shape and size required to fit the device, loose-welding adjacent free ends to constitute the casing a rigid structure to permit machining to proper size, and opening the welded seam to provide a slit in the casing.

5. In the art of producing a magnetizable structure, the method which comprises imparting to a peripherally discontinuous magnetizable structure substantially a tubular configuration, effecting continuity of the periphery of the structure, altering the configuration of the structure, and restoring its peripheral discontinuity.

6. In the art of producing a magentizable structure, the method which comprises imparting to a peripherally discontinuous hot metallic magnetizable structure substantially a tubular configuration, effecting continuity of the periphery of the structure, cooling the structure and altering its configuration, and restoring the peripheral discontinuity of the structure.

7. In the art of producing a magnetizable structure, the method which comprises imparting to a peripherally discontinuous magnetizable structure substantially a tubular configuration, maintaining substantial continuity of the periphery of the structure while altering the configuration thereof, and restoring its peripheral discontinuity.

In testimony whereof, we have hereunto subscribed our names this 17 day of November, 1923.

CARL S. WEYANDT.
HAROLD E. FOX.